(12) United States Patent
Parker

(10) Patent No.: US 12,448,220 B2
(45) Date of Patent: Oct. 21, 2025

(54) ELECTRICALLY DRIVEN SHELVING SYSTEM WITH A LiDAR OPERATING SYSTEM

(71) Applicant: GLIDESTORE FREETRACK PTY LTD, Unley (AU)

(72) Inventor: Brian Parker, Unley (AU)

(73) Assignee: Glidestore Freetrack Pty Ltd., Unley (AU)

( * ) Notice: Subject to any disclaimer, the term of this patent is extended or adjusted under 35 U.S.C. 154(b) by 632 days.

(21) Appl. No.: 17/638,938

(22) PCT Filed: May 27, 2020

(86) PCT No.: PCT/AU2020/050532
§ 371 (c)(1),
(2) Date: Feb. 28, 2022

(87) PCT Pub. No.: WO2021/035285
PCT Pub. Date: Mar. 4, 2021

(65) Prior Publication Data
US 2022/0289491 A1   Sep. 15, 2022

(30) Foreign Application Priority Data
Aug. 29, 2019 (AU) ................................ 2019903170

(51) Int. Cl.
*B65G 43/00* (2006.01)
*A47B 53/02* (2006.01)
*B65G 1/10* (2006.01)

(52) U.S. Cl.
CPC .............. *B65G 43/00* (2013.01); *A47B 53/02* (2013.01); *B65G 1/10* (2013.01); *B65G 2203/044* (2013.01)

(58) Field of Classification Search
CPC .... B65G 43/00; B65G 1/10; B65G 2203/044; B65G 1/1371; A47B 53/02
See application file for complete search history.

(56) References Cited

U.S. PATENT DOCUMENTS

| | | |
|---|---|---|
| 2002/0109078 A1 | 8/2002 | Housh et al. |
| 2006/0227317 A1 | 10/2006 | Henderson et al. |
| 2007/0228262 A1* | 10/2007 | Cantin .................... G01S 7/481 250/221 |
| 2013/0083316 A1* | 4/2013 | Mimeault .............. G01B 11/14 356/73 |
| 2016/0282453 A1 | 9/2016 | Pennecot et al. |

* cited by examiner

Primary Examiner — Kyle O Logan
(74) Attorney, Agent, or Firm — Sand, Sebolt & Wernow Co., LPA

(57) ABSTRACT

A mobile shelving system comprising a plurality of shelving bay rows including at least one driven shelving bay mounted on a track and a LiDAR scanning arrangement scanning the outside of the shelving system to detect any object reflecting the light, determining where that break has occurred and acting on the shelving system to move it at that point to open up an aisle.

11 Claims, 4 Drawing Sheets

ELECTRICALLY DRIVEN SHELVING SYSTEM WITH A LiDAR OPERATING SYSTEM

FIELD OF THE INVENTION

The present invention relates to mobile shelving systems, in particular to an electrically driven shelving system with a LiDAR operating system

BACKGROUND TO THE INVENTION

Mobile shelving systems are popular means for reducing the floor area needed for storage. Typically a series of rows of shelving bays are mounted abutting each other thus eliminating the space needed for aisle ways between the shelving bays. The shelving bays are mounted on tracks so that when access is required to a particular shelving bay the shelving bays can be moved along the track to open up an aisle way.

The shelving bays can be moved by hand or driven by electric motors, with electric operation being preferred, especially for large systems which may be too heavy to move manually. Conventional electric systems provide an electric motor for each row of shelving bays whilst others allow a selectable number of the shelving bays to be coupled in series with the driven shelving bay and driven in unison along the track to open up an aisle for access to a desired shelving bay, or to close an aisle. This avoids the need to have a drive motor on each row as well as the associated power distribution infrastructure, which saves time and effort by the user.

However with electrically driven shelving systems, there is the danger of the aisles being blocked by an object or person. For example, if a user is in an open aisle a second user may wish to access a location in a different aisle and accordingly instruct the system to move the bays to allow access to the location. Because the system is electronic, the second user may not be aware that the first user is within the system, and there is the risk of injury to the first user when the bays move. Thus there are designs that can detect if an object or a person is within the aisle and prevent the system for operating.

Typically each shelving bay has a control mechanism that a user has to activate to start or stop shelving from moving provided that all safety standards are met. With multiple shelving units this may be quite expensive to install.

The object of the invention is to provide a mobile shelving system with a LiDAR control system to operate the shelving system from moving or stopping, or at least provide the public with a useful alternative.

SUMMARY OF THE INVENTION

It should be noted that any one of the aspects mentioned above may include any of the features of any of the other aspects mentioned above and may include any of the features of any of the embodiments described below as appropriate.

A scanning arrangement for a mobile shelving system comprising a LiDAR creating a vertical wall of light beams along the side of the shelving system, detecting any reflection of the light beams by an obstruction, determining the location of the break and activing the mobile shelving system to move so as to create an aisle at that location.

Preferably the system does not move until the obstruction has been removed.

Preferably whilst the shelving system is moving a further obstruction in the laser light causes it to stop moving.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF THE INVENTION

Figure 1:
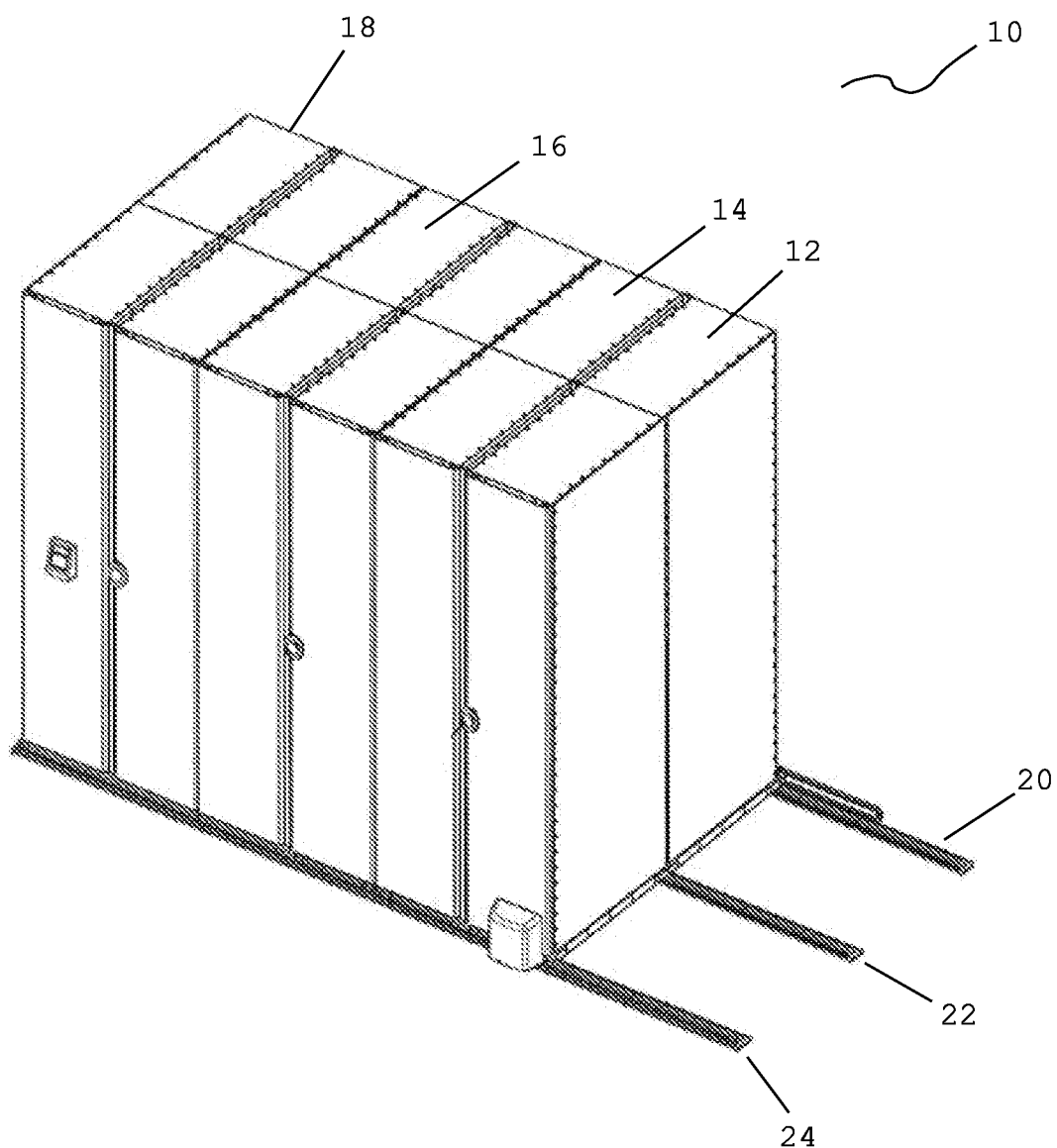
FIG. 1 shows a perspective view of a mobile shelving system according to the present invention with no open aisles.

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The invention provides a LiDAR scanning system for a mobile shelving system comprising a plurality of shelving bay rows. Besides each shelving bay having its own motor, adjacent shelving bays can be releasably coupleable to each other thereby allowing a selectable number of the shelving bays to be coupled in series with the driven shelving bay and driven in unison along the track to open up an aisle for access to a desired shelving bay, or to close an aisle. This avoids the need to have a drive motor on each row as well as the associated power distribution infrastructure. Typically a floor scanning system detects people or items that may be present in an aisle way and if detected will prevent operation of the system to ensure safety.

A perspective view of a mobile shelving bay system 10 incorporating the invention is shown in FIG. 1. The system comprises a series of adjacent shelving bays that span between tracks, such as single bay 12, double bays 14 and 16 and single bay 18 between tracks 20, 22 and 24.

This arrangement is demonstrative, other arrangements comprising more or less rows and more or less adjacent bays are also encompassed by the invention. A floor scanning system is not visible in this figure but resides under the bays and is the subject of separate patents.

Figure 2:
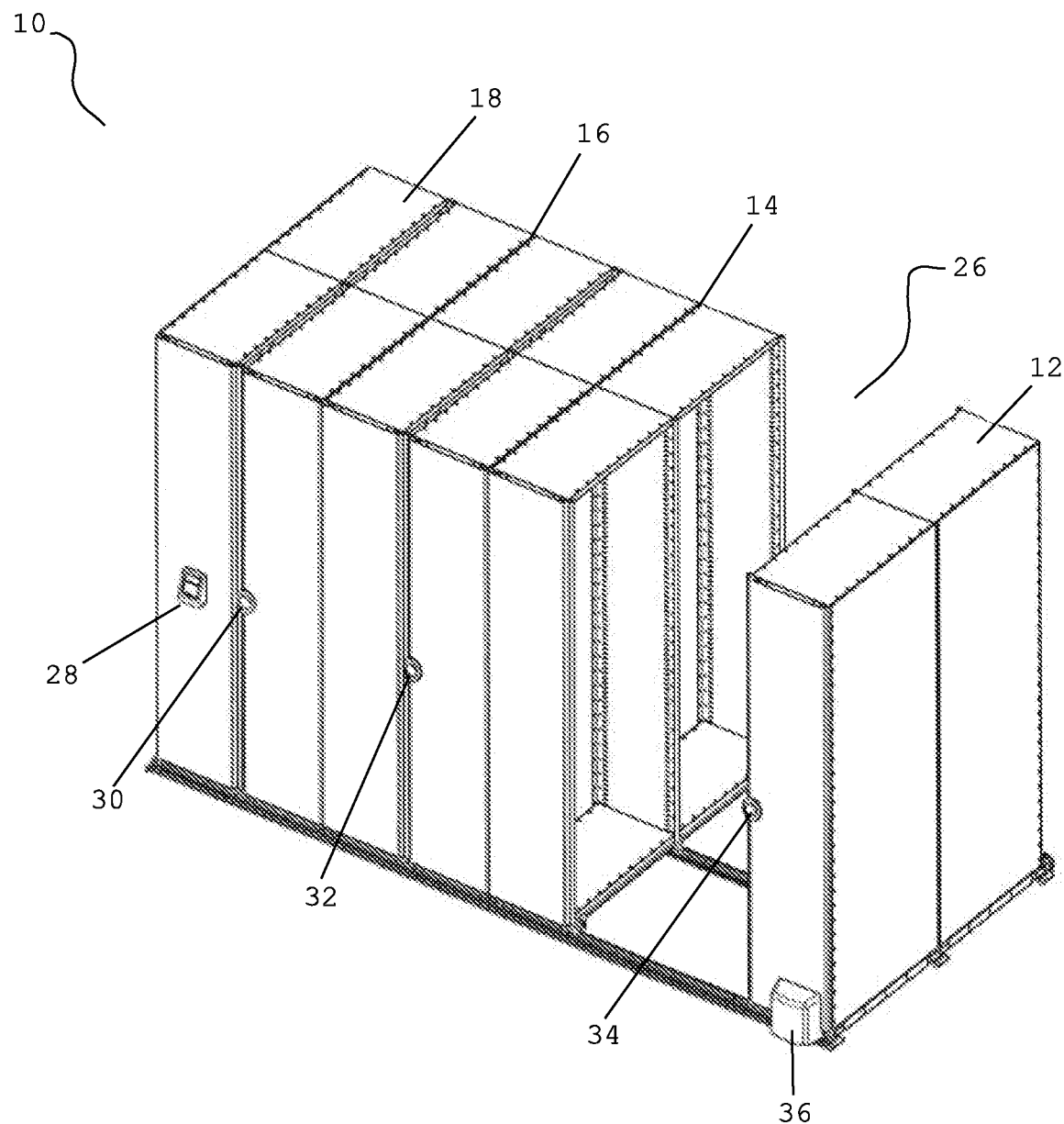
FIG. 2 shows the mobile shelving system of FIG. 1 with an open aisle.

To access the contents of a particular shelving bay, adjacent rows must be separated to form an aisle. In FIG. 2 rows 12 and 14 are separated to form an aisle 26 to provide access to the internal chamber of each shelving bay. Similarly aisles may be formed between the other rows.

To allow and control propulsion of the various rows previous systems included a control panel 28 fitted to row 18 and a series of access buttons 30, 32 and 34 fitted to the rows adjacent to where an aisle may be desired. The access buttons provide a simple interface for users who press a button to initiate the opening of the adjacent aisle. The buttons comprise a small circuit board to transmit switch closure signals to the control panel 28.

The control panel 28 typically provided a keypad, display and speaker to interact with a system administrator, displaying status messages and allowing for system resets etcetera. The control panel also interfaced with access buttons, drive motor module 36 and other safety systems controlling operation of the system.

The drive module 36 provides motive force to row 12 and any other rows that are coupled to it. The drive module can take many forms, with a preferred embodiment comprising a geared electric motor driving a sprocket which in turn engages a chain within the track. The motor is typically fitted with a current monitor and rotary encoder to facilitate a control system that can adapt the motion profile to optimise traversal times of the system independent of the load whilst maintaining safe operation as well as allowing the position of the driven row 12 to be determined.

A LiDAR is a surveying method that measures the distance to a target by illuminating the target with laser light and measuring the reflected light with a sensor. Differences in laser return times and wavelengths can then be used to make digital 2-D or 3-D representations of the target.

LIDAR's are available that use a low power light beam that is driven by a modulated pulse. The laser emits light in a very short time frame and can be safe for humans and animals. The modulated laser can effectively avoid interference from ambient light and sunlight. During its operation the LiDAR can output data via well-known communications interfaces. Each sample point of data contains information as to the distance and angle of measurement and the data is outputted continuously.

Figure 3:
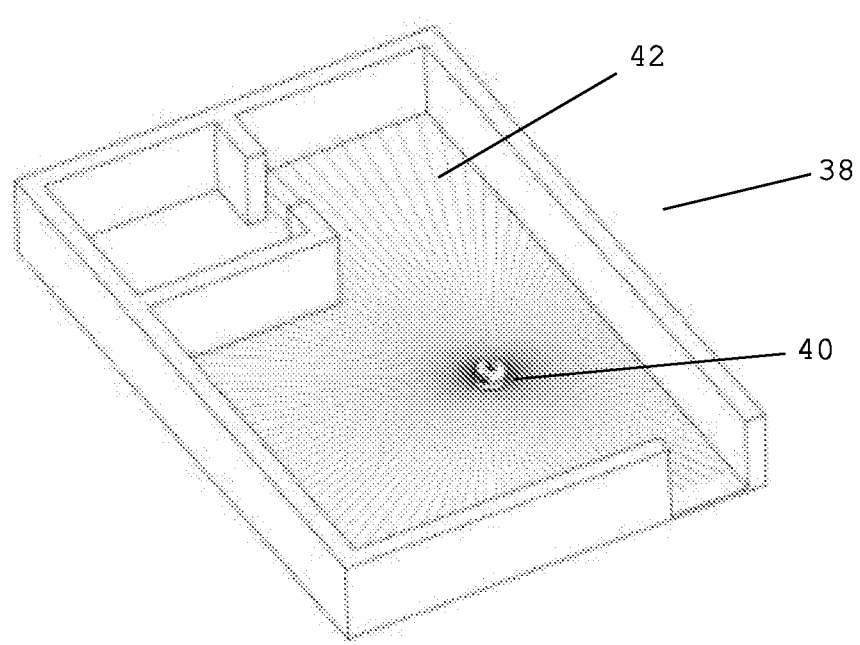
FIG. 3 illustrates the scanning arrangement of a LiDAR in a room.

Referring now to FIG. 3 there is shown a typical use of a LiDAR for scanning or mapping a room 38. The LiDAR 40 emits laser light 42 in a 360 degree arc and can thus map room 38. If a beam is reflected by an object the LiDAR can output information as to the exact location where the beam has been interrupted by a sensor picking up the reflection.

Figure 4:
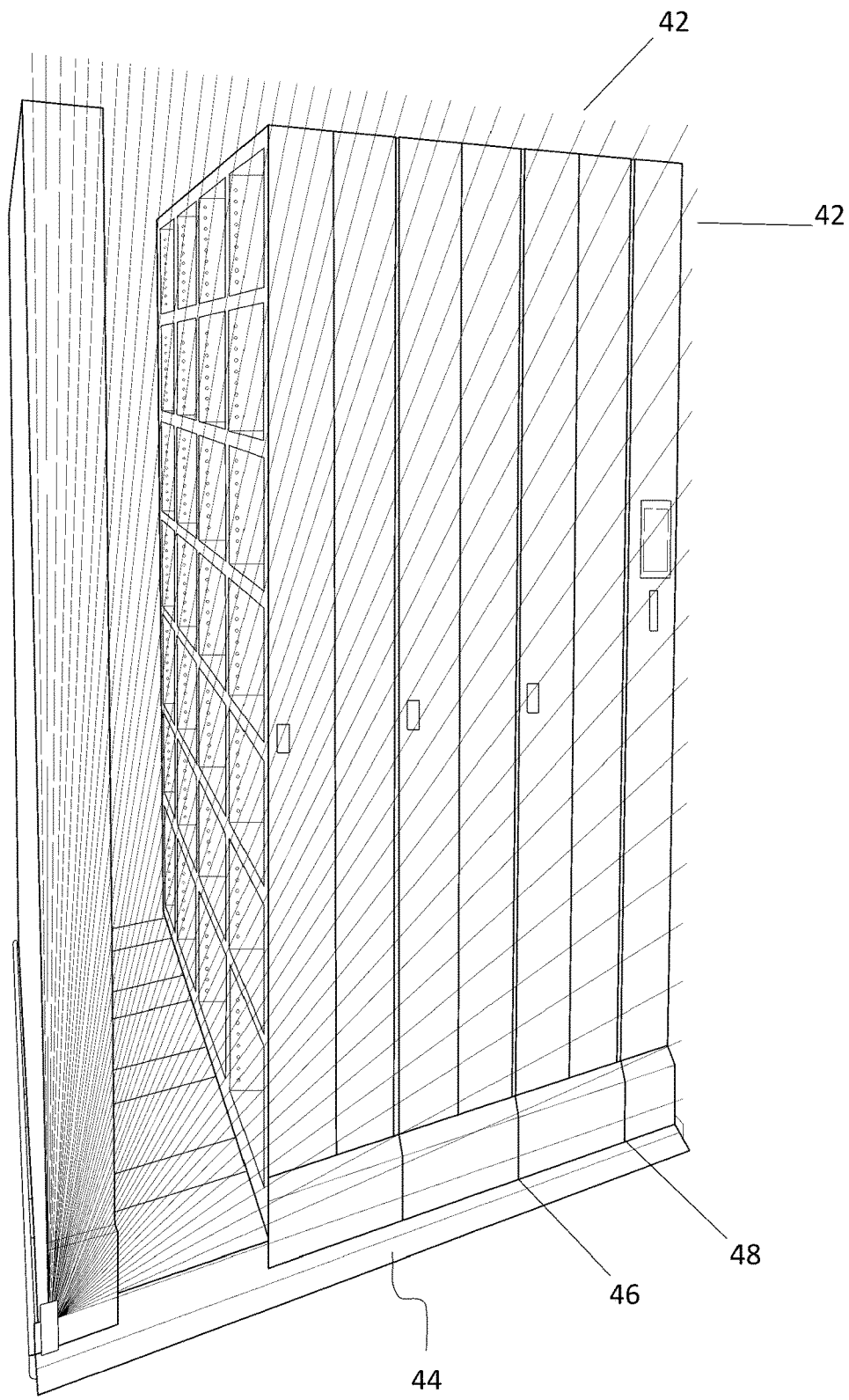
FIG. 4 illustrates the LiDAR being applied to the side of a mobile shelving system to be able to operate the shelving system

A LiDAR is thus employed to scan the outside of a shelving system as illustrated in FIG. 4. In this case the LiDAR only needs to scan an angle of 90 degrees and once it has mapped the outside of the shelving system it continually scans. Outputs can be as much as 8000 samples per second with the resolution in distance being centimetres.

Once the LiDAR has effectively scanned the outside of the shelving a reflection from any of the beams (forming a virtual wall) it will be able to calculate exactly where the obstruction has occurred. Typically one wants to know where the light has been reflected corresponding to vertical axis 44, 46 and 48 for example as relevant in FIG. 4. This reflection may be accomplished by simply inserting a hand into the laser light. The system then calculates which shelving bay the hand moved in front of and then controls that shelving bay to move and an aisle to open.

The reader will now appreciate the present invention which provides an electrically driven shelving system with a scanning arrangement to determine obstructions within the system.

When the system is not under power and immobile, the LiDAR 'virtual wall' will be programmed to pick-up a gesture (hand chopping down for example), identify the location of the gesture, and then power the system open at that point.

Whilst the system is under power and moving, the LiDAR will be programmed to pick up any disturbance/break in the beams. This break in the 'virtual wall' will trigger the system to stop immediately.

Of course any user will need to be clear of the LiDAR prior to the compactus moving. This means that any limbs used for the gestures must be out of the scanning plane prior to the motor engaging, essentially the same as for the beam break. The scanning plane may be a few centimetres from the side of the shelving system.

Other improvements may very well be made to the shelving system as described above. For example, there could be a pre-set time whereby if the obstacle is not removed within a certain period of time, the shelving system will not operate. There may also be audio or visual indicia to the user to tell them that the system has accepted their "command" and thus they can remove their hand. Multiple gestures may be required, for example, the user may have to use both hands to open an aisle thus preventing passive opening of the shelving system by someone just walking by to name but a few.

LIST OF COMPONENTS

The drawings include the following integers:
10 mobile shelving bay system
12 bay
14 double bay
16 double bay
18 bay
20 track
22 track
24 track
26 aisle
28 control panel
30 access button
32 access button
34 access button
36 drive module
38 room
40 LiDAR
42 laser light
44 vertical axis
46 vertical axis
48 vertical axis Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:
1. A mobile shelving system, comprising:
 a plurality of shelving bays releasably coupled to each another;

a drive mechanism configured to facilitate a movement of the shelving bays;

a control module configured to enable operation of the drive mechanism; and a LIDAR module operably coupled to the control module;

wherein the LIDAR module emits a wall of light beams along an outside of the shelving bays, detecting any reflection of the light beams by an obstruction, and determining a location of the obstruction;

wherein the wall of light beams do not contact the shelving bays; and wherein upon determining the location of the obstruction, the shelving bays are caused to move so as to create an aisle defined as between the shelving bays at the location of the obstruction.

2. The mobile shelving system of claim 1, wherein the shelving bays do not move until the obstruction has been removed.

3. The mobile shelving system of claim 1, wherein whilst the shelving bays are moving, a further obstruction of the light beams prevents further movement of the shelving bays.

4. The mobile shelving system of claim 1, further comprising a plurality of access points located on the plurality of shelving bays, the plurality of access points are operably coupled to the control module; whereby an activation of an access point of the plurality of access points causes the shelving bays to move, creating an opening at a location of the access point.

5. The mobile shelving system of claim 4, wherein the plurality of access points are buttons.

6. The mobile shelving system of claim 1, wherein the drive mechanism is an electric motor.

7. The mobile shelving system of claim 1, wherein the plurality of shelving bays are mounted on a trackway.

8. The mobile shelving system of claim 7, wherein the trackway comprises three tracks.

9. The mobile shelving system of claim 1, wherein each of the plurality of shelving bays comprise their own drive mechanism.

10. The mobile shelving system of claim 1, wherein the LIDAR module only determines the location of the obstruction when the mobile shelving system is not in motion.

11. The mobile shelving system of claim 1, wherein the control module is activatable through voice operation.

\* \* \* \* \*